US012749635B2

(12) United States Patent
Fang

(10) Patent No.: US 12,749,635 B2
(45) Date of Patent: Sep. 29, 2026

(54) DIGITAL DISPLAY POWER SWITCH

(71) Applicant: XiaMen YiDongsheng Technologies Co Ltd, Xiamen (CN)

(72) Inventor: Zhiqin Fang, Xiamen (CN)

(73) Assignee: XiaMen YiDongsheng Technologies Co Ltd, Xiamen (CN)

( * ) Notice: Subject to any disclaimer, the term of this patent is extended or adjusted under 35 U.S.C. 154(b) by 326 days.

(21) Appl. No.: 18/648,586

(22) Filed: Apr. 29, 2024

(65) Prior Publication Data

US 2025/0079097 A1 Mar. 6, 2025

(30) Foreign Application Priority Data

Sep. 4, 2023 (CN) ......................... 202322393453.2

(51) Int. Cl.
*H01H 19/14* (2006.01)
*H01H 19/02* (2006.01)

(52) U.S. Cl.
CPC .......... *H01H 19/14* (2013.01); *H01H 19/025* (2013.01)

(58) Field of Classification Search
CPC ........ H01H 19/14; H01H 19/025; H01H 3/08; H01H 19/001; H01H 19/02; H01H 19/08; H01H 19/10; H01H 19/46; H01H 19/50; H01H 19/54; H01H 19/56; H01H 2205/002; H01H 2205/032; H01H 2219/01; H01H 2219/014; H01H 2219/018; H01H 2219/022; H01H 2219/024; H01H 2219/026; H01H 2219/028; H01H 2219/036; H01H 2221/01
See application file for complete search history.

(56) References Cited

U.S. PATENT DOCUMENTS 7,462,795 B2 * 12/2008 Montalvo ............ H01H 19/025 200/11 R
9,911,556 B2 * 3/2018 Lee ...................... H03K 17/968
12,112,903 B2 * 10/2024 Jang ....................... H01H 25/06

* cited by examiner

*Primary Examiner* — Lheiren Mae A Caroc
(74) *Attorney, Agent, or Firm* — Bayramoglu Law Offices LLC

(57) ABSTRACT

A digital display power switch includes a rotating assembly, a conducting assembly, and a display assembly. An accommodating space is formed in the rotating assembly. The display assembly is provided in the accommodating space, and is not in contact with the rotating assembly. The rotating assembly is provided with an avoiding part, and a middle of the rotating assembly is provided with a rotating shaft. The conducting assembly includes a fixed seat, a conductive sheet, a conducting element, and a connecting conductor. The conductive sheet is connected to the rotating shaft. The conducting element is located on the fixed seat. The conductive sheet is driven by the rotating shaft to form an electric connection contact point with the conducting element. The fixed seat is provided with a post, and the connecting conductor passes through the avoiding part along the post and is then fixedly conductive with the display assembly.

10 Claims, 14 Drawing Sheets

DIGITAL DISPLAY POWER SWITCH

CROSS REFERENCE TO THE RELATED APPLICATIONS

This application is based upon and claims priority to Chinese Patent Application No. 202322393453.2, filed on Sep. 4, 2023, the entire contents of which are incorporated herein by reference.

TECHNICAL FIELD

The present disclosure relates to a digital display power switch.

BACKGROUND

In the prior art, mechanically rotary direct current (DC) switches are not provided with a digital display screen and cannot display electrical parameters during use due to the lack of the digital display screen. Therefore, users cannot observe the working status of a device in real time, such as load current, input battery voltage stability, and consumption, resulting in inconvenience of use. In addition, typically, before connecting the switch and the device, the user needs to measure the input electrical parameters by a multimeter to prevent damage to the device.

For example, most car modification or equipment installation users need to add a digital display device next to the mechanical switch without a display function. However, this may result in cost increases and insufficient space for installation, which will bring great trouble to the users.

SUMMARY

To solve the above technical problem, an objective of the present disclosure is to provide a digital display power switch.

The present disclosure is implemented by the following technical solution. A digital display power switch includes a rotating assembly, a conducting assembly, and a display assembly, where an accommodating space is formed in the rotating assembly; the display assembly is provided in the accommodating space, and the display assembly is not in contact with the rotating assembly; the rotating assembly is provided with an avoiding part, and a middle of the rotating assembly is provided with a rotating shaft; the conducting assembly includes a fixed seat, a conductive sheet, a conducting element, and a connecting conductor; the conductive sheet is connected to the rotating shaft; the conducting element is located on the fixed seat; the conductive sheet is driven by the rotating shaft to form an electric connection contact point with the conducting element; the fixed seat is provided with a post; the post passes through the avoiding part and is then fixedly connected to the display assembly; and the connecting conductor electrically connects the conducting element to a circuit board of the display assembly.

Preferably, the digital display power switch further includes a housing; the rotating assembly is connected to the housing; the rotating shaft is inserted into the housing; and the post passes through the housing and the avoiding part and is then fixedly connected to the display assembly.

Preferably, a toggle sheet and a compression spring are further provided in the accommodating space; the compression spring is provided between the conductive sheet and the toggle sheet; and the rotating shaft passes through the toggle sheet, the compression spring, and the conductive sheet in sequence and is then inserted into a central slot of the fixed seat.

Preferably, the conducting element includes a first conducting element and a second conducting element; and the first conducting element and the second conducting element respectively contact two ends of the conductive sheet to form a path.

Preferably, the conducting element further includes a third conducting element; and polarity of the third conducting element is opposite to polarity of the first conducting element or the second conducting element.

Preferably, the first conducting element or the second conducting element is a positive screw element, and the third conducting element is a negative screw element.

Preferably, the post includes a first post and a second post; the display assembly is fixedly connected to the first post and the second post by the circuit board through a fixing rod; and a gap is formed between the display assembly and the rotating assembly.

Preferably, a guide rib is further provided at a radial position of the first post or the second post; and the connecting conductor extends along the guide rib to the circuit board for soldering.

Preferably, the connecting conductor includes a guide ring and a conducting post; the guide ring is fixedly sleeved on the conducting element; the conducting post extends along the post to the circuit board for connection; a periphery of the conducting post partially forms a clamping part; and the clamping part forms a limit fit with the guide rib of the post.

Preferably, the digital display power switch further includes a detachable base; the detachable base is connected to a bottom of the housing, and the detachable base includes a base and a detachable sheet; the base and the housing form an interference fit or transition fit through a protruding rib and a connecting hole; and the detachable sheet is provided inside the base in a piecewise manner.

In the present disclosure, the digital display power switch realizes the digital display function in a mechanically rotary switch, and can visually display parameter information such as voltage, current, power, and temperature. The digital display power switch is particularly suitable for modified circuits of domestic and foreign automobiles, recreational vehicles, yachts, and transportation vehicles. The mechanical digital display switch features small volume and convenient mounting, and can realize various electrical parameters without the need for an additional digital display screen device, greatly reducing costs.

BRIEF DESCRIPTION OF THE DRAWINGS

To describe the technical solutions in the present disclosure more clearly, the following briefly introduces the drawings required for describing the embodiments or the prior art. Apparently, the drawings in the following description show merely some embodiments of the present disclosure, and a person of ordinary skill in the art may still derive other drawings from these drawings without creative efforts.

DETAILED DESCRIPTION OF THE EMBODIMENTS

Figure 1:
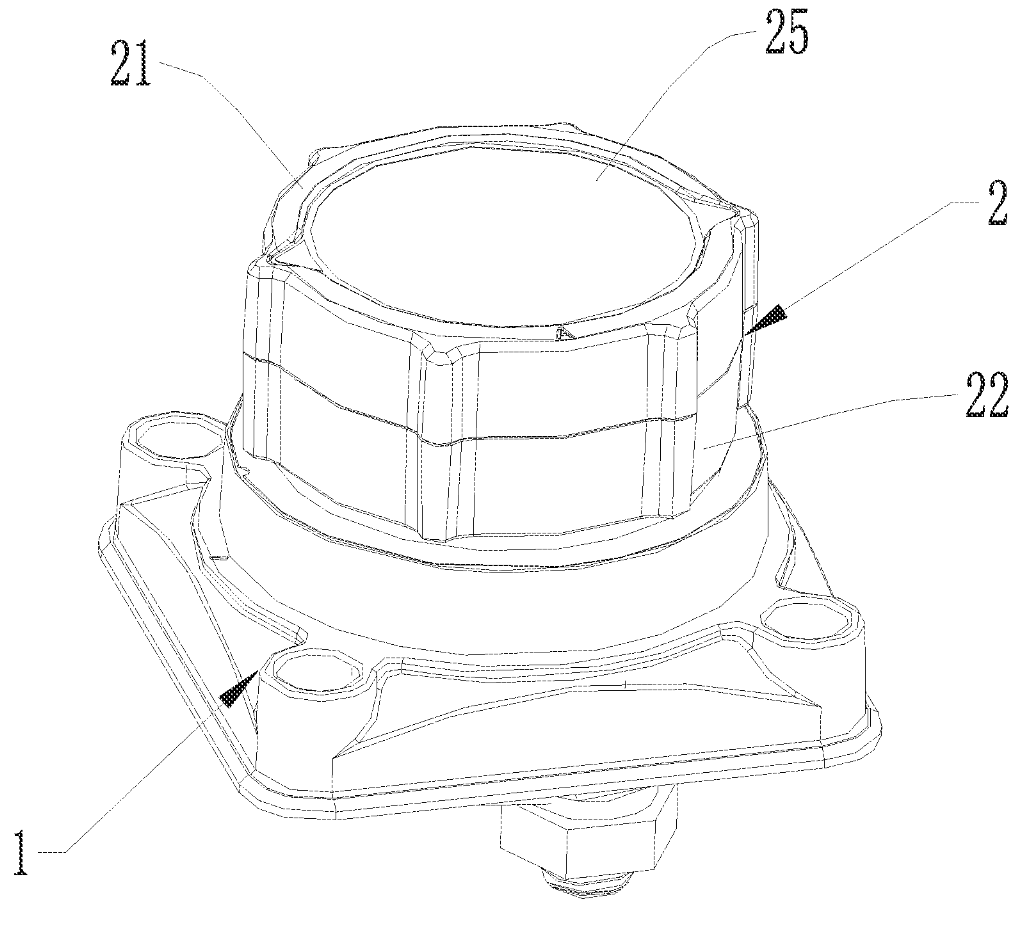
FIG. 1 is a three-dimensional view of a digital display power switch according to the present disclosure.
Figure 2:
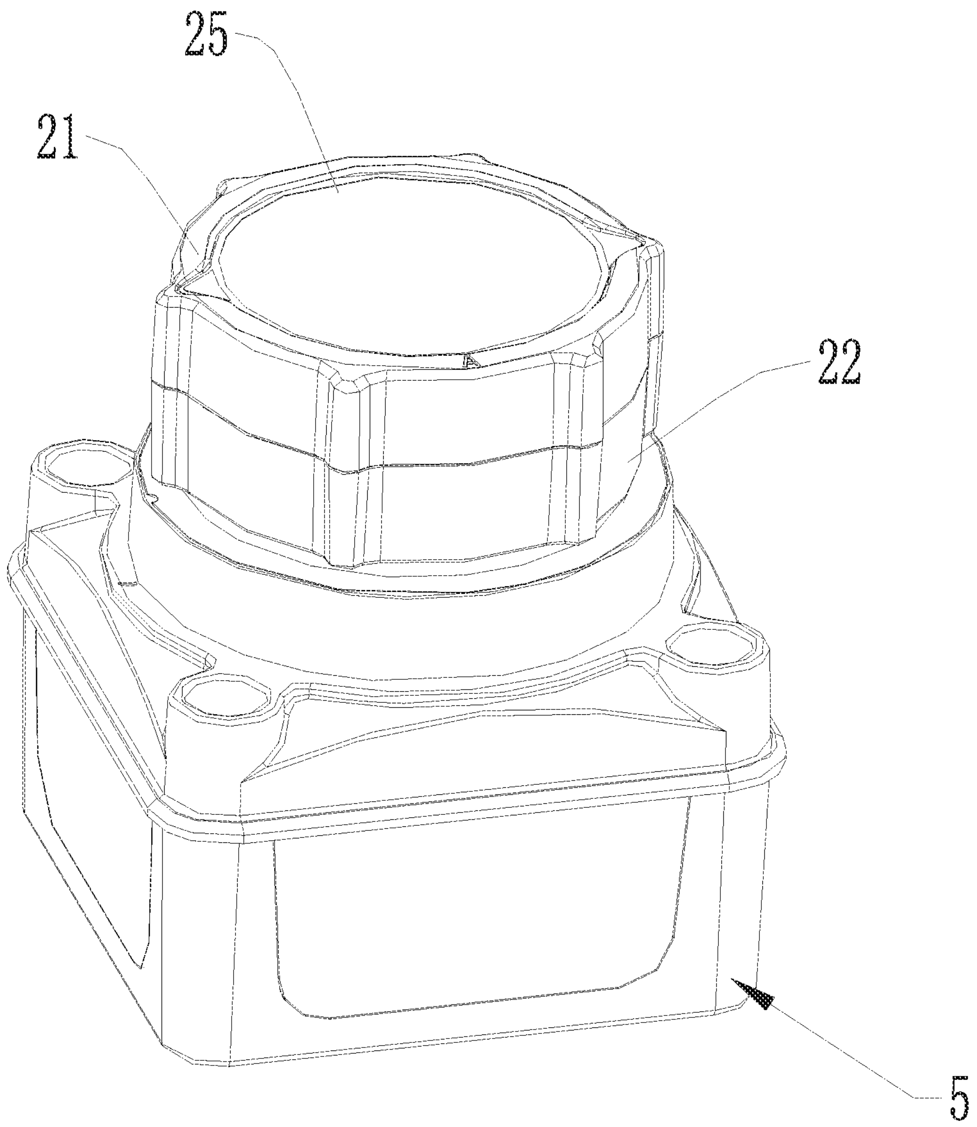
FIG. 2 is a three-dimensional view of a digital display power switch with a detachable base according to the present disclosure.
Figure 3:
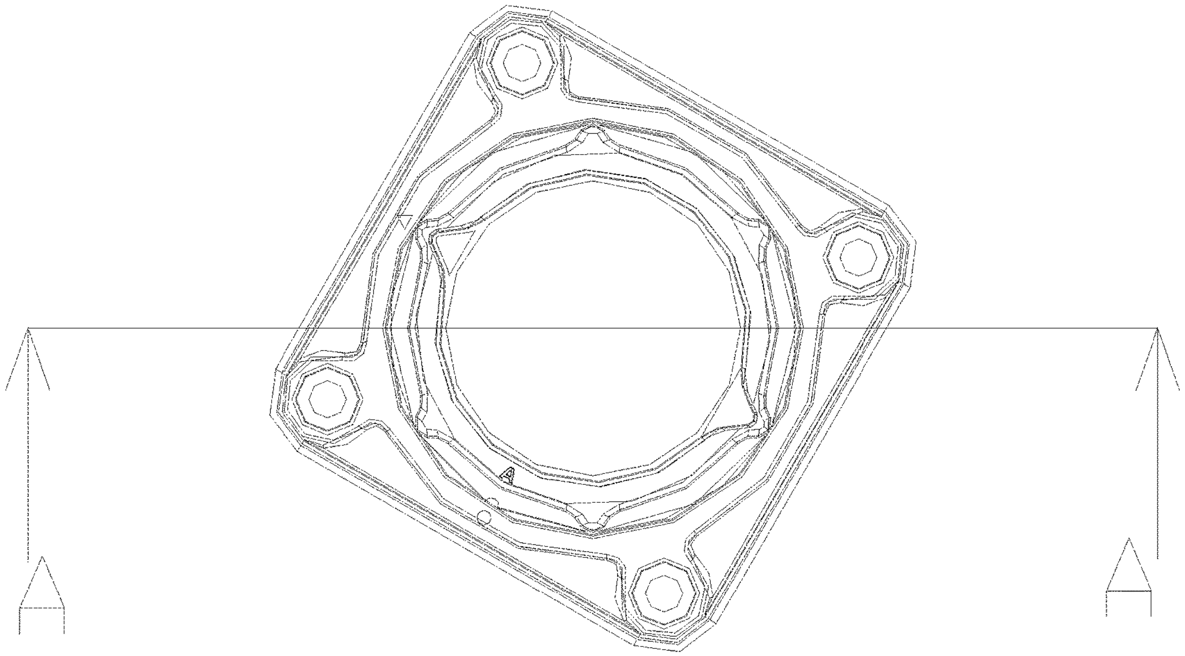
FIG. 3 is a top view of the digital display power switch according to the present disclosure.
Figure 4:
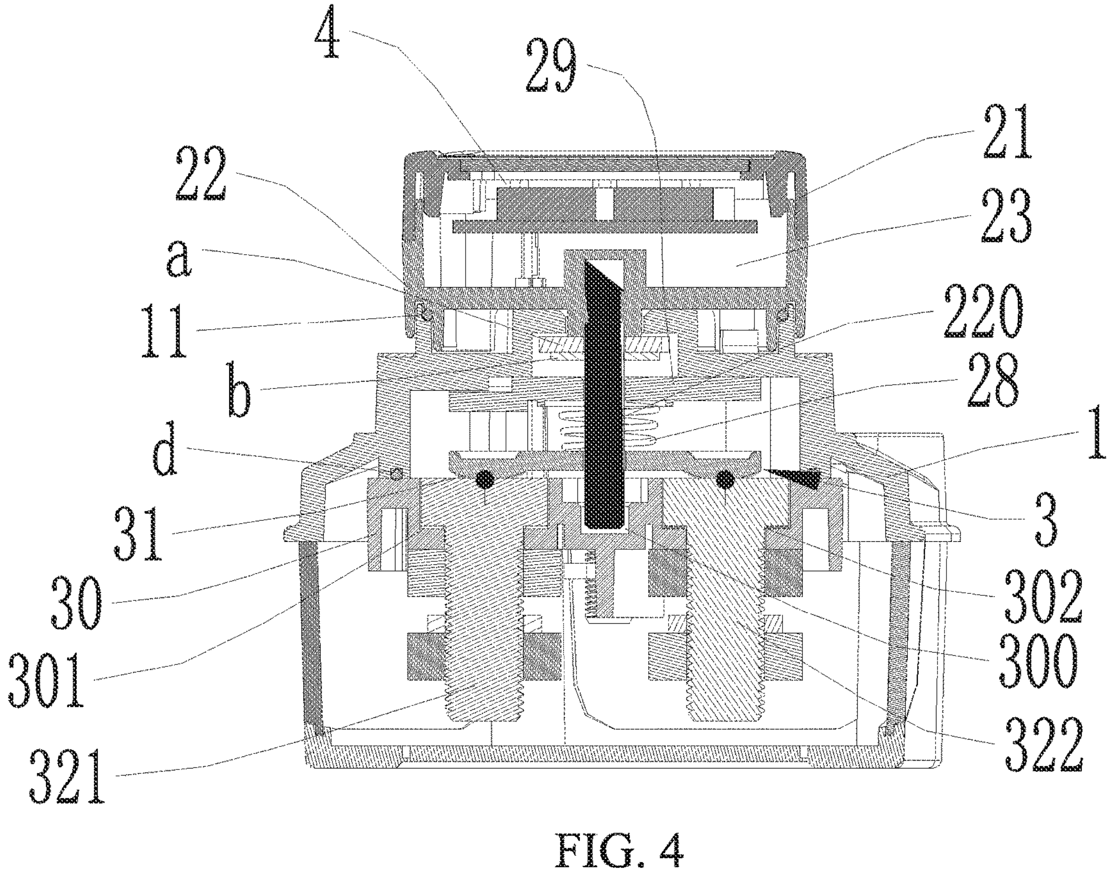
FIG. 4 is a section view taken along A-A shown in FIG. 3.
Figure 5:
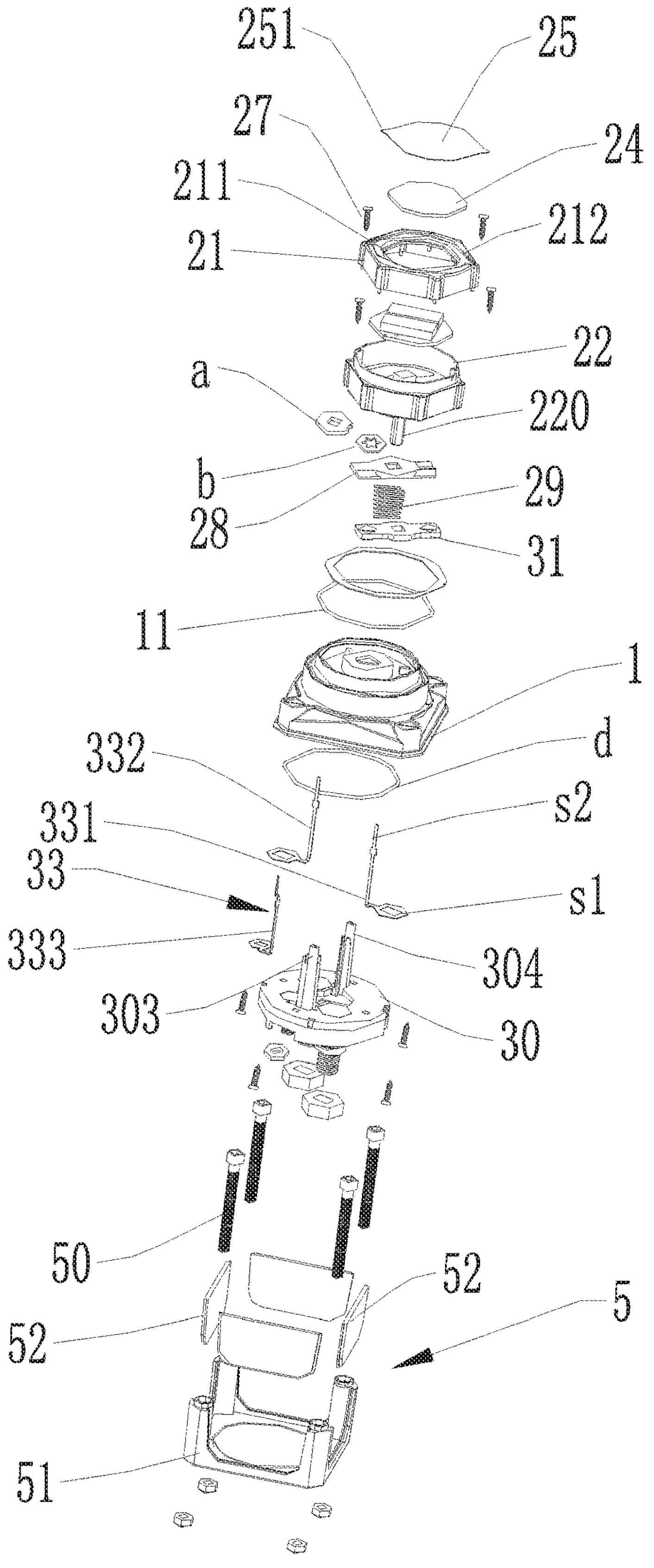
FIG. 5 is an exploded view of the digital display power switch according to the present disclosure.
Figure 6:
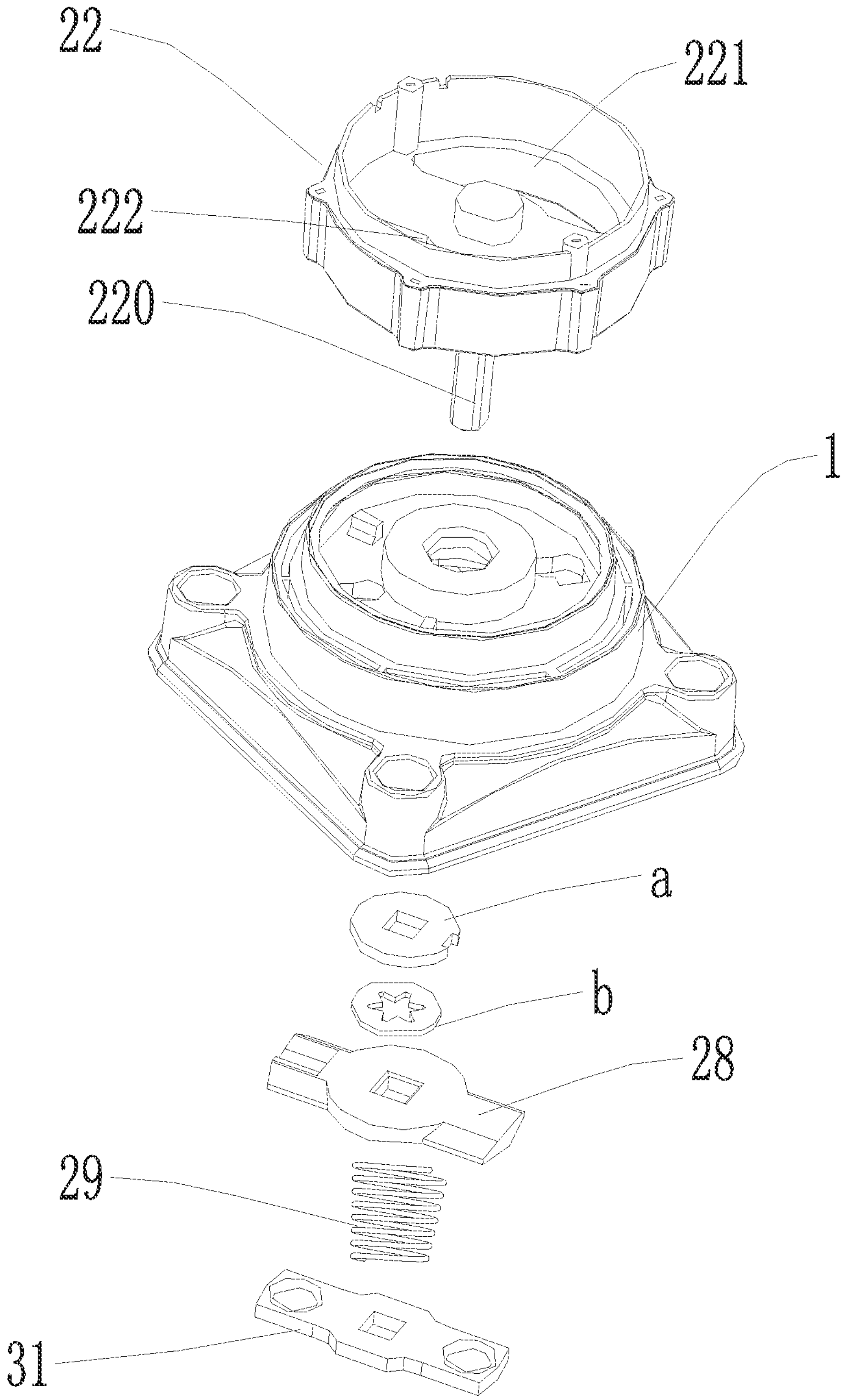
FIGS. 6 and 7 are partially exploded views of the digital display power switch according to the present disclosure.
Figure 7:
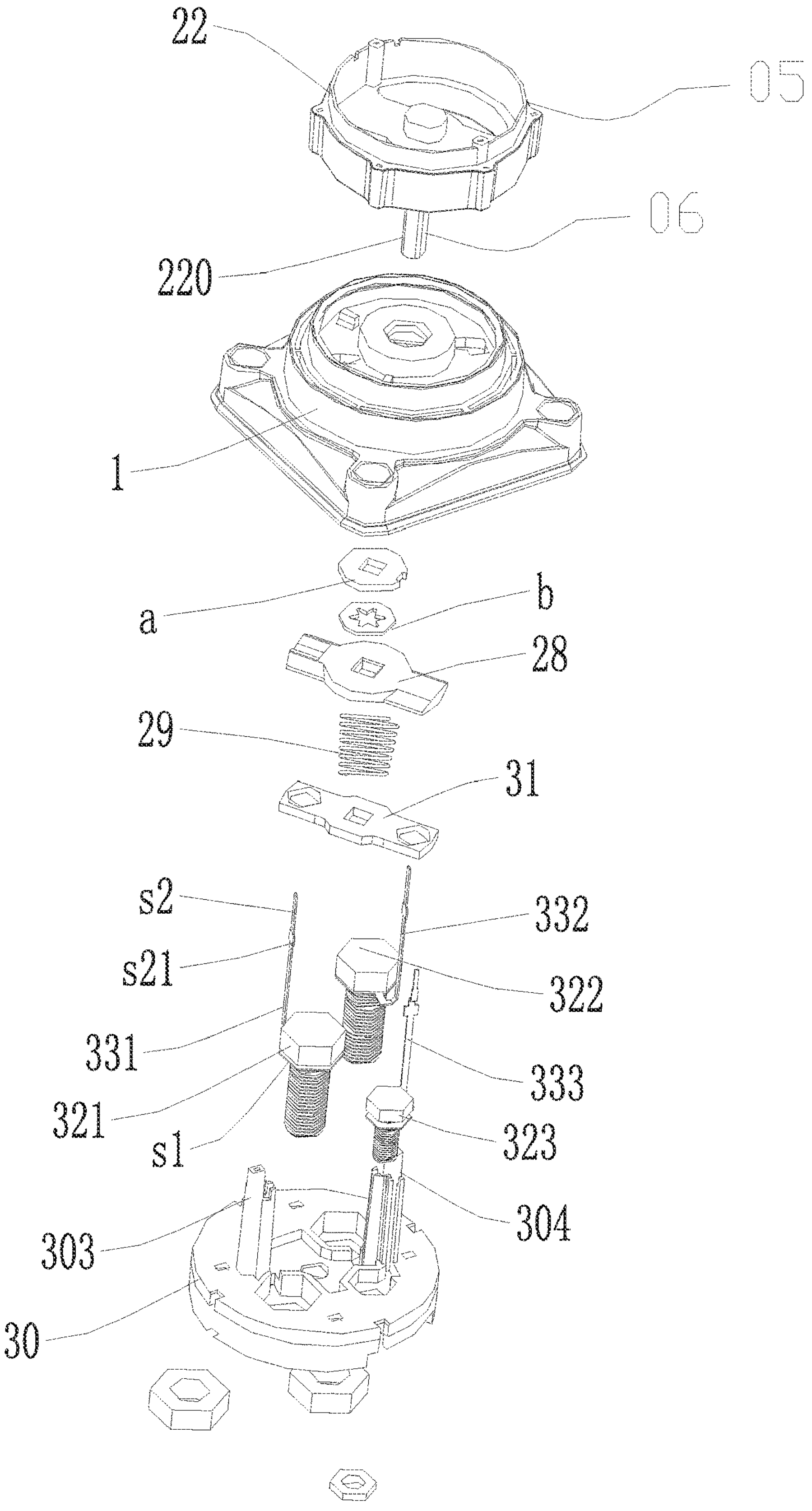
Figure 8:
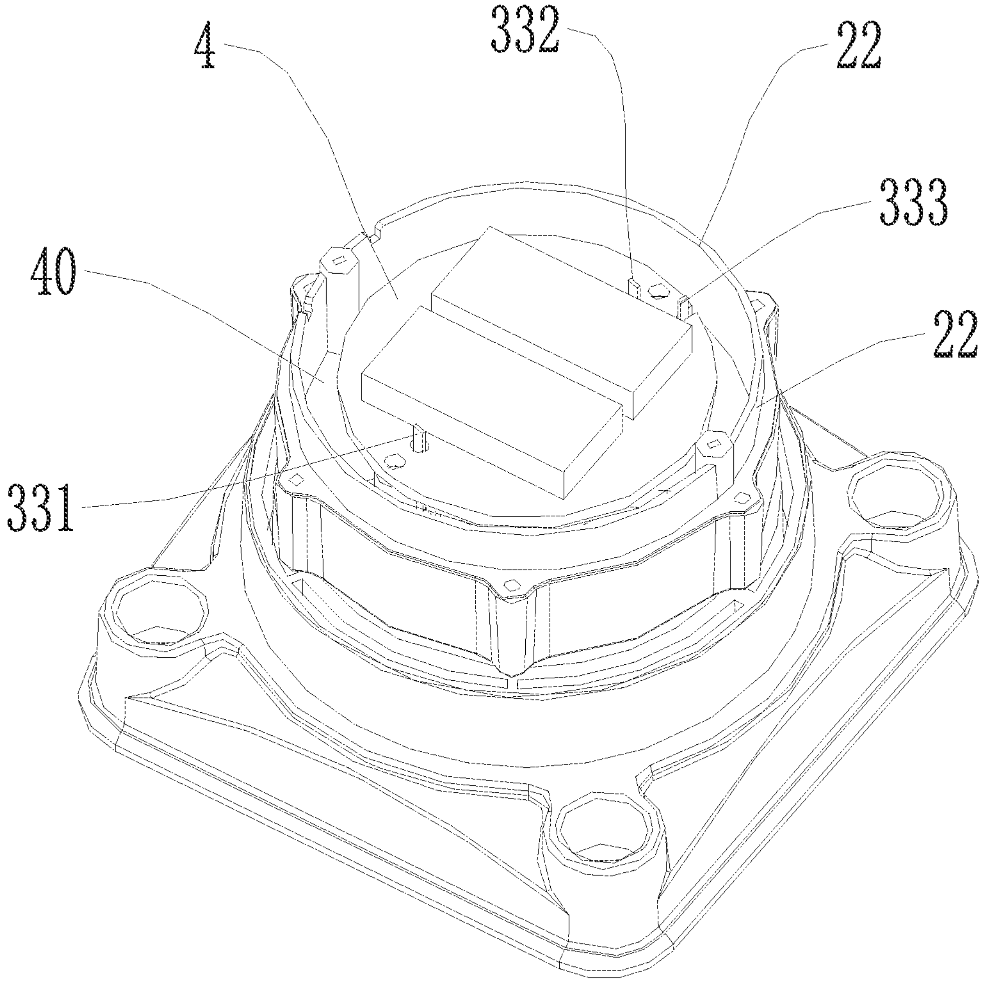
FIG. 8 is an assembly view of a lower rotating cover and a display assembly according to the present disclosure.
Figure 9:
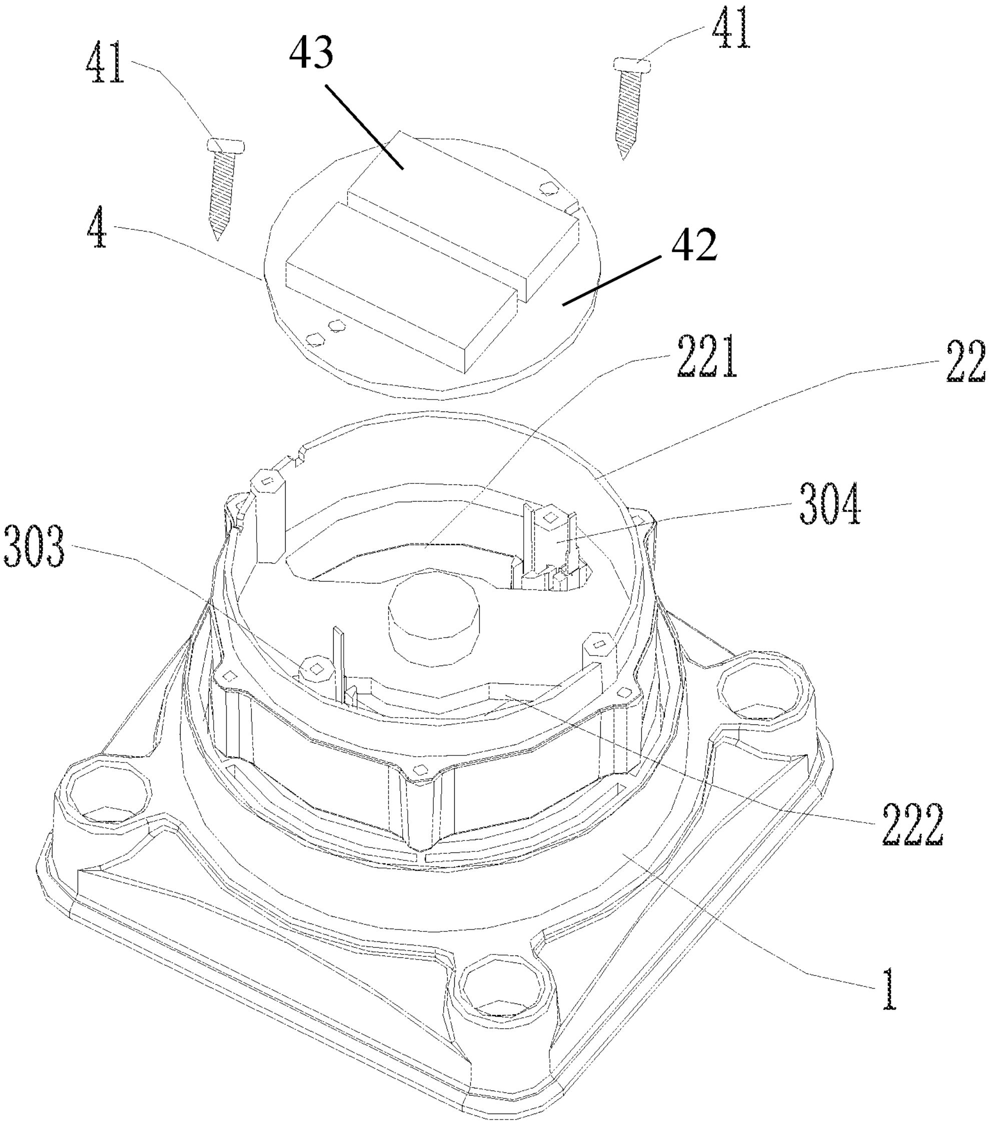
FIG. 9 is a partially exploded view of the lower rotating cover and the display assembly according to the present disclosure.
Figure 10:
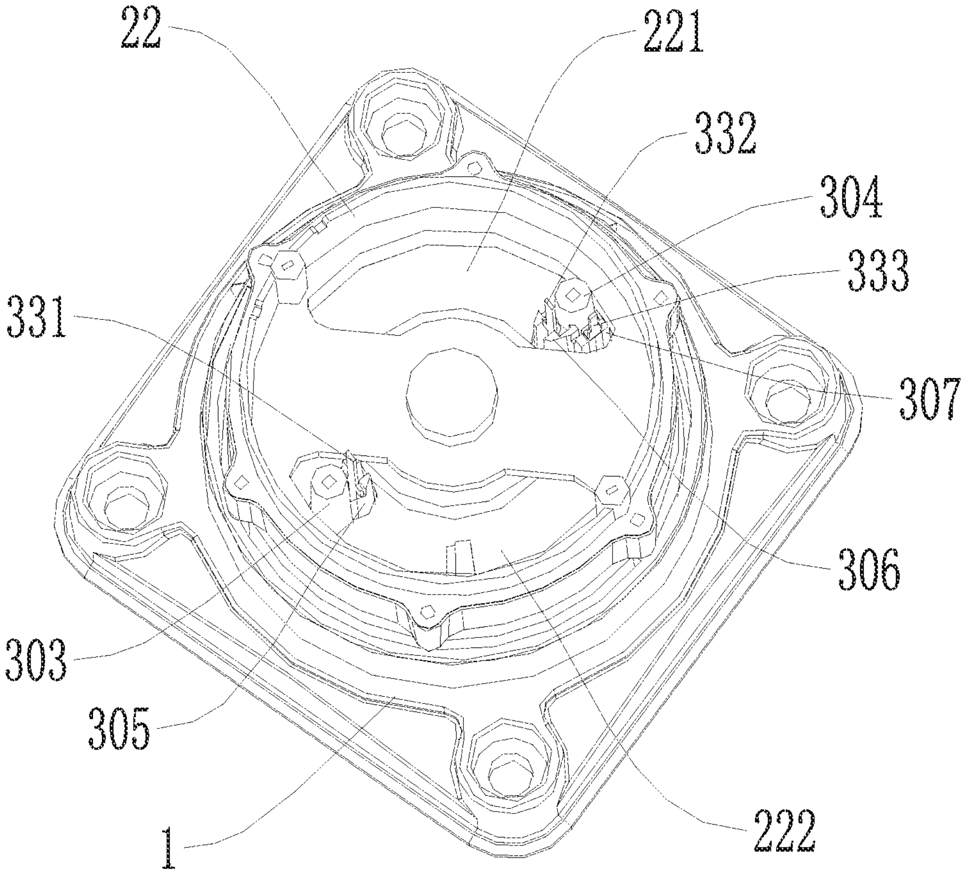
FIG. 10 is a structural diagram of the lower rotating cover according to the present disclosure.

The technical solutions in embodiments of the present disclosure will be described below clearly and completely with reference to the drawings in the embodiments of the present disclosure. Apparently, the described embodiments are merely a part, rather than all of the embodiments of the present disclosure. All other embodiments derived from the embodiments of the present disclosure by those of ordinary skill in the art without creative efforts shall fall within the protection scope of the present disclosure.

As shown in FIGS. 1 to 12, a digital display power switch includes housing 1, rotating assembly 2, conducting assembly 3, and display assembly 4. The rotating assembly 2 is connected to the housing 1. The rotating assembly 2 includes a rotating cover. The rotating cover includes upper rotating cover 21 and lower rotating cover 22. Accommodating space 23 is formed between the upper rotating cover 21 and the lower rotating cover 22. The upper rotating cover 21 and the lower rotating cover 22 are fixedly connected by fastener 27, which is, for example, a fixing screw. An inner ring of the upper rotating cover 21 forms first receiving part 211. Transparent lens 24 is provided inside the receiving part 211. In order to further protect the internal structure of the power switch, nameplate 25 is provided on an upper end of the transparent lens 24. Symmetrical ends of the nameplate 25 form protruding parts 251. The nameplate 25 is located inside second receiving part 212 of the upper rotating cover 21. The specific shape of the second receiving part 212 matches the shape of the nameplate 25. In a specific embodiment, the nameplate 25 is fixed by adhesive bonding. A bottom of the lower rotating cover 22 is further provided with rotating shaft 220. The rotating shaft 220 is integrated or connected to the lower rotating cover 22. Gasket a is provided at a joint between the rotating shaft 220 and the lower rotating cover 22. A lower end of the gasket a is positioned by clamping spring b. The clamping spring is, for example, a quincunx-shaped clamping spring. The gasket matches the clamping spring to prevent parts of the lower rotating cover from falling off. In addition, the rotating shaft 220 is inserted into the housing 1. Furthermore, a groove is formed at the bottom of the lower rotating cover 22. The housing 1 is inserted into the groove. Sealing ring 11 is further provided between the housing 1 and the groove to provide sealing protection. Furthermore, first avoiding part 221 and second avoiding part 222 are provided inside the lower rotating cover 22.

The display assembly 4 is provided in the accommodating space 23, and the display assembly 4 is not in contact with the rotating assembly. The display assembly 4 includes a circuit board and a display screen. The display screen is a liquid crystal display (LCD) or light-emitting diode (LED) screen or indicator light. A user views relevant parameter information of the display screen through a screen display area formed by the transparent lens 24. The conducting assembly 3 includes fixed seat 30, conductive sheet 31, conducting element 32, and a connecting conductor. The connecting conductor electrically connects the conducting element 32 to the circuit board to form a conductive path. The conductive sheet 31 is connected to the rotating shaft 220. The rotating shaft 220 is configured to drive the conductive sheet 31 to rotate. In addition, toggle sheet 28 and compression spring 29 are further provided in the accommodating space 23. The compression spring 29 is provided between the conductive sheet 31 and the toggle sheet 28. An inclined part of the toggle sheet 28 cooperates with the housing and the compression spring to form an elastic clamping slot space. The toggle sheet 28 forms a clamping fit with an internal bump of the housing 1, facilitating intuitive toggling for the user. The rotating shaft 220 passes through the toggle sheet 28, the compression spring 29, and the conductive sheet 31 in sequence and is then limited in central slot 300 of the fixed seat 30. In this way, the conductive sheet 31 has sufficient pressure to contact with the conducting element 32, thereby forming a conductive contact point for a large current to pass through.

Figure 12:
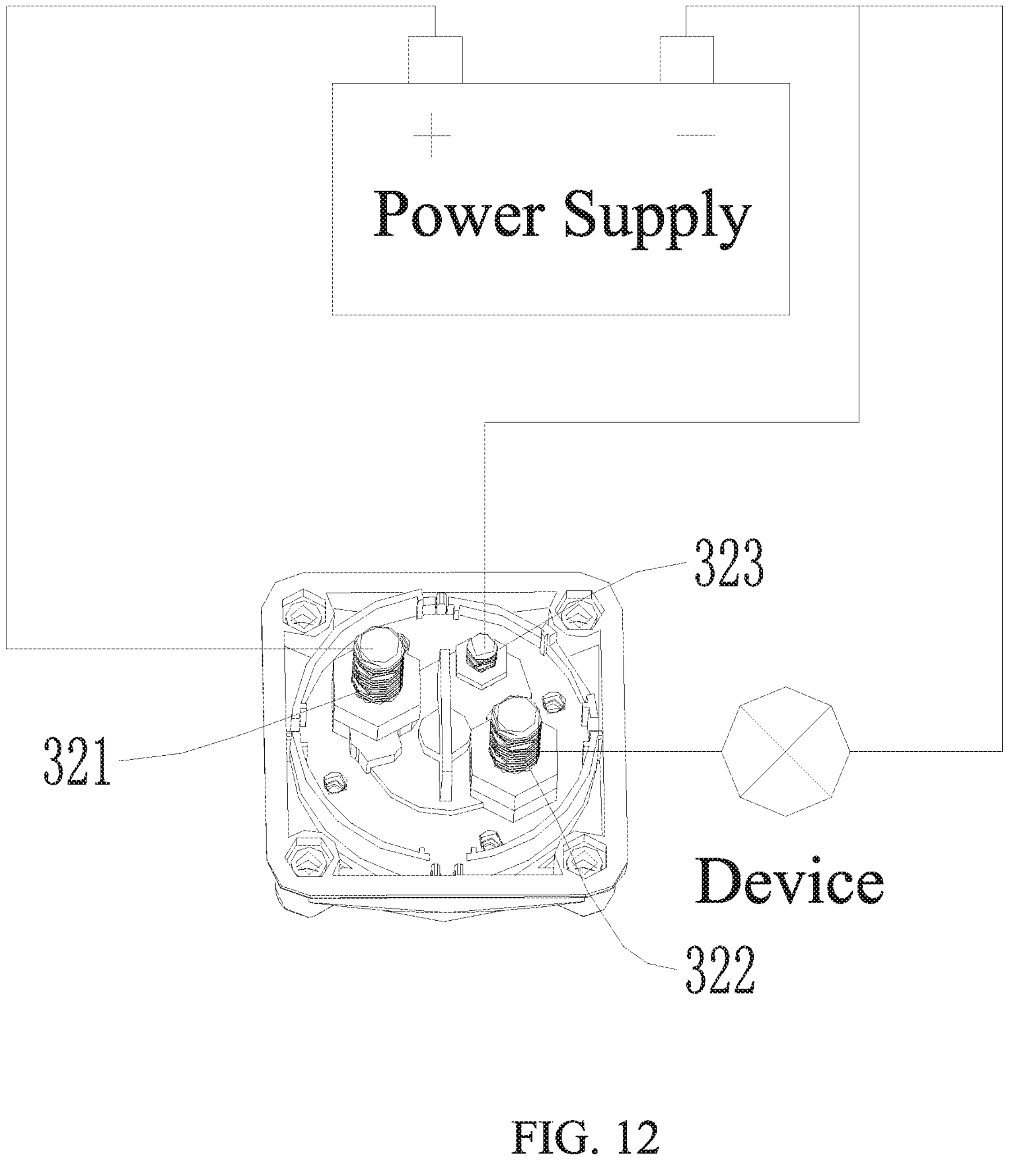
FIG. 12 is a schematic diagram of circuit connection according to the present disclosure.

The conducting element 32 is located on the fixed seat 30. The conducting element 32 includes at least first conducting element 321 and second conducting element 322. In a specific embodiment, the first conducting element 321 or the second conducting element 322 is, for example, a screw element. More preferably, the first conducting element 321 or the second conducting element 322 is, for example, a hexagonal screw element. Furthermore, the conducting element 32 may include third conducting element 323. The polarity of the third conducting element 323 is opposite to that of the first conducting element or the second conducting element. For example, as shown in FIG. 12, in this embodiment, the first conducting element 321 or the second conducting element 322 is a positive screw element, and the third conducting element 323 is a negative screw element. The addition of the negative screw element to the power supply polarity enables a power supply and the conducting element to form a path to display parameter information.

The main sealing ring d is provided between the fixed seat 30 and the housing 1. The fixed seat 30 includes first mounting part 301, second mounting part 302, and the central slot 300. The central slot 300 and the rotating shaft 220 form a limit fit. The first conducting element 321 and the second conducting element 322 are fixedly provided in the first mounting part 301 and the second mounting part 302, respectively. The fixed seat 30 is further provided with first post 303 and second post 304. The circuit board of the display assembly 4 is provided on the first post 303 and the second post 304. The first post 303 and the second post 304 pass through the housing 1 and respectively extend from the first avoiding part 221 and the second avoiding part 222 of the lower rotating cover. The display assembly is fixedly connected to the first post and the second post by the circuit board through fixing rod 41 such as a fixing screw, such that the display assembly is fixedly connected to the fixed seat. Gap 40 is formed between the display assembly and the lower rotating cover to prevent the rotating assembly from contacting and rotating the display assembly when it rotates. The first avoiding part 221 and the second avoiding part 222 serve as avoiding spaces for a rotation angle, such that there is no connection between the rotating assembly and the display assembly. In this way, when a knob rotates, the display assembly does not rotate with it, and real-time parameter display is achieved.

Figure 11:
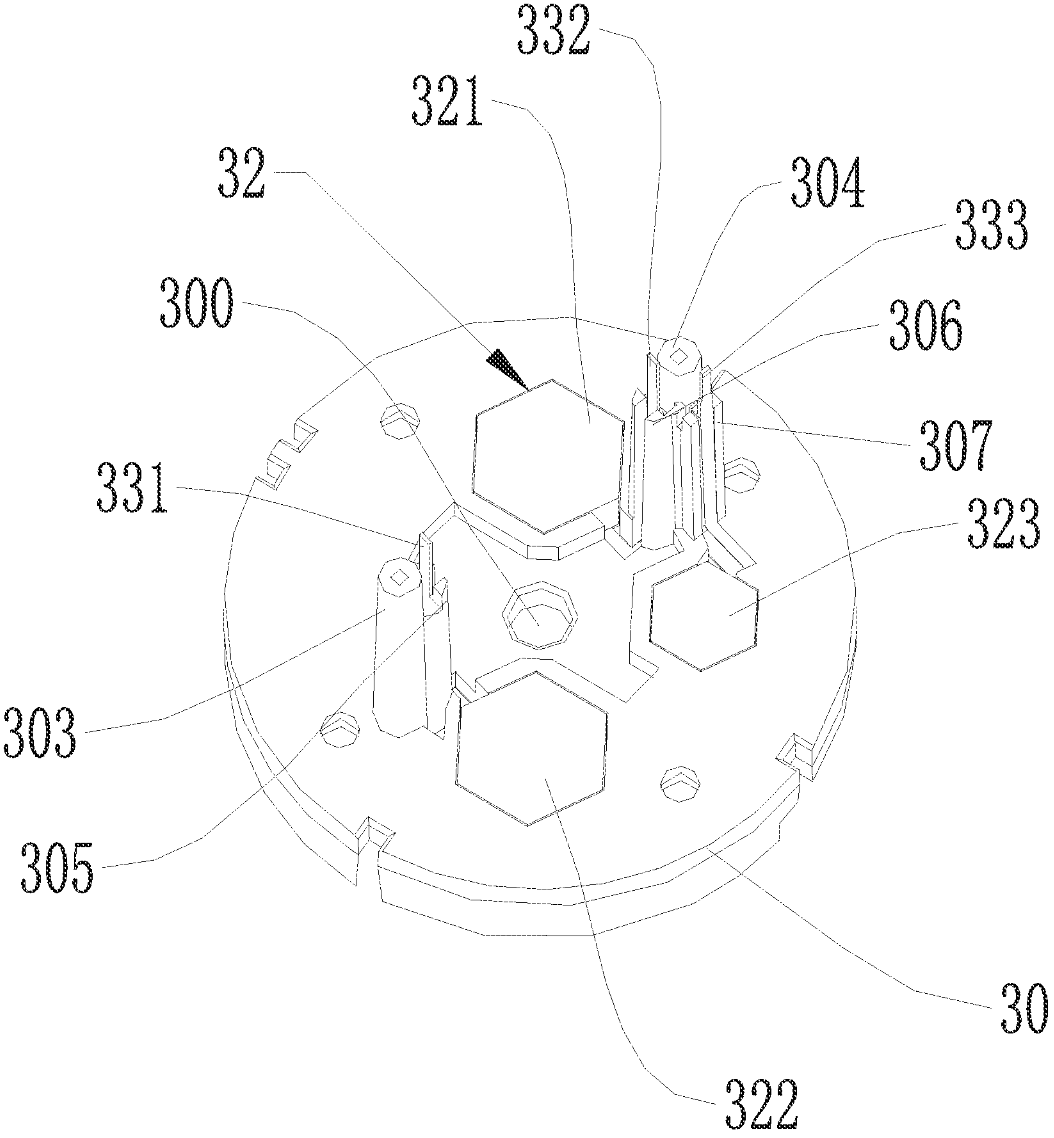
FIG. 11 is a structural diagram of a fixed seat according to the present disclosure.

In addition, first guide rib 305 is located at a radial position of the first post 303, and second guide rib 306 is located at a radial position of the second post 304. In another embodiment, the positions and number of guide ribs are not limited, and multiple guide ribs can be arranged according to a required structure. For example, as shown in the figure of the present disclosure, third guide rib 307 is located at a radial position of the second post 304. In a more specific embodiment, as shown in FIG. 11, the conducting element is adjacent to the post. The first conducting element and the second conducting element are symmetrical and adjacent to the posts. The first conducting element and the second conducting element are located at two sides of the posts. This design shortens the connection path and effectively reduces costs.

The connecting conductor 33 is, for example, a copper sheet, including first connecting conductor 331 and second connecting conductor 332. The first connecting conductor 331, for example, includes guide ring s1 and conducting post s2. The guide ring s1 is fixedly sleeved on the conducting element 32, such that the guide ring s1 contacts and connects the conducting element 32 and the conducting post s2 extends along the guide rib to the circuit board for soldering. Therefore, a power supply signal presents a conducted state. Further, a periphery of the conducting post s2 may be partially provided with clamping part s21. The clamping part s21 forms a limit fit with the groove at the guide rib to ensure the working reliability of the structure and prolong the service life. The structure of the second connecting conductor is similar to that of the first connecting conductor 331. Of course, in this embodiment, the connecting conductor 33 may further include third connecting conductor 333. The third connecting conductor 333 is connected to the third conducting element 323 and the circuit board, and its conducting post is in conductive connection with the circuit board along the third guide rib 307. In the present disclosure, the digital display power switch realizes the digital display function in a mechanically rotary switch, and can visually display parameter information such as voltage, current, power, and temperature. The digital display power switch is particularly suitable for modified circuits of domestic and foreign automobiles, recreational vehicles, yachts, and transportation vehicles. The mechanical digital display switch features small volume and convenient mounting, and can realize various electrical parameters without the need for an additional digital display screen device, greatly reducing costs.

Figure 13:
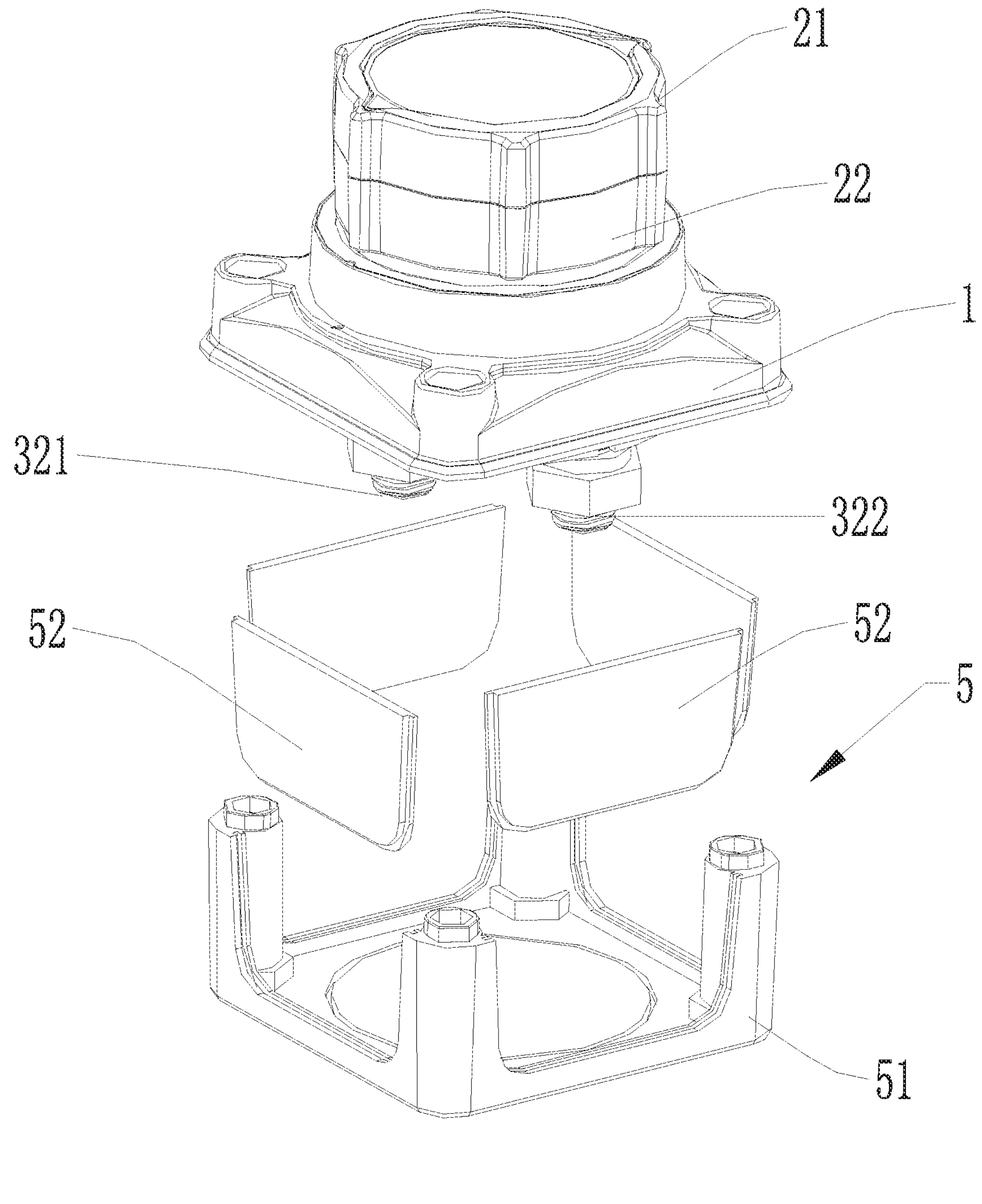
FIG. 13 is an exploded view of the digital display power switch with a detachable base according to the present disclosure.
Figure 14:
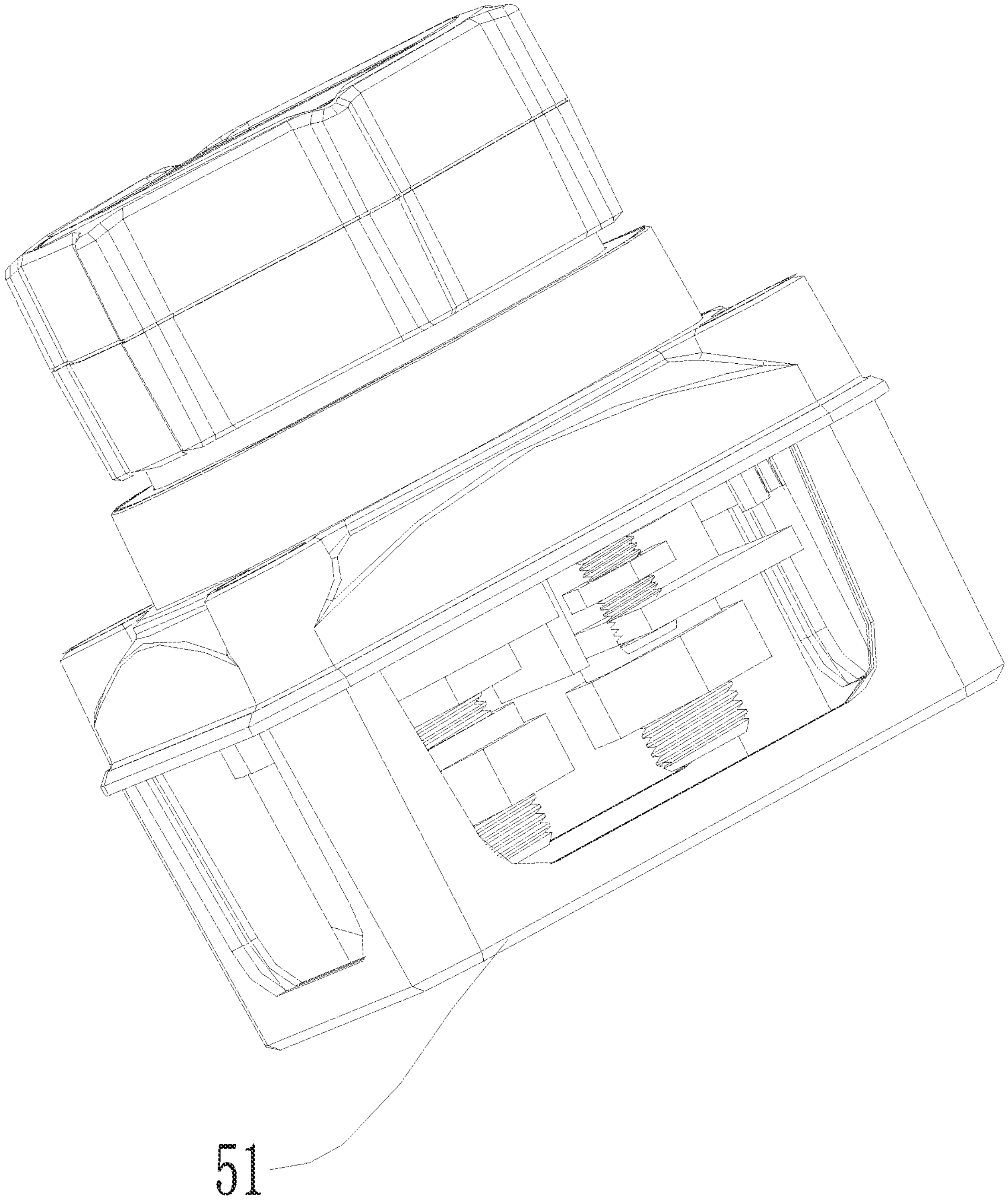
FIG. 14 is a structural diagram of the digital display power switch with a detachable base according to the present disclosure.
Figure 15:
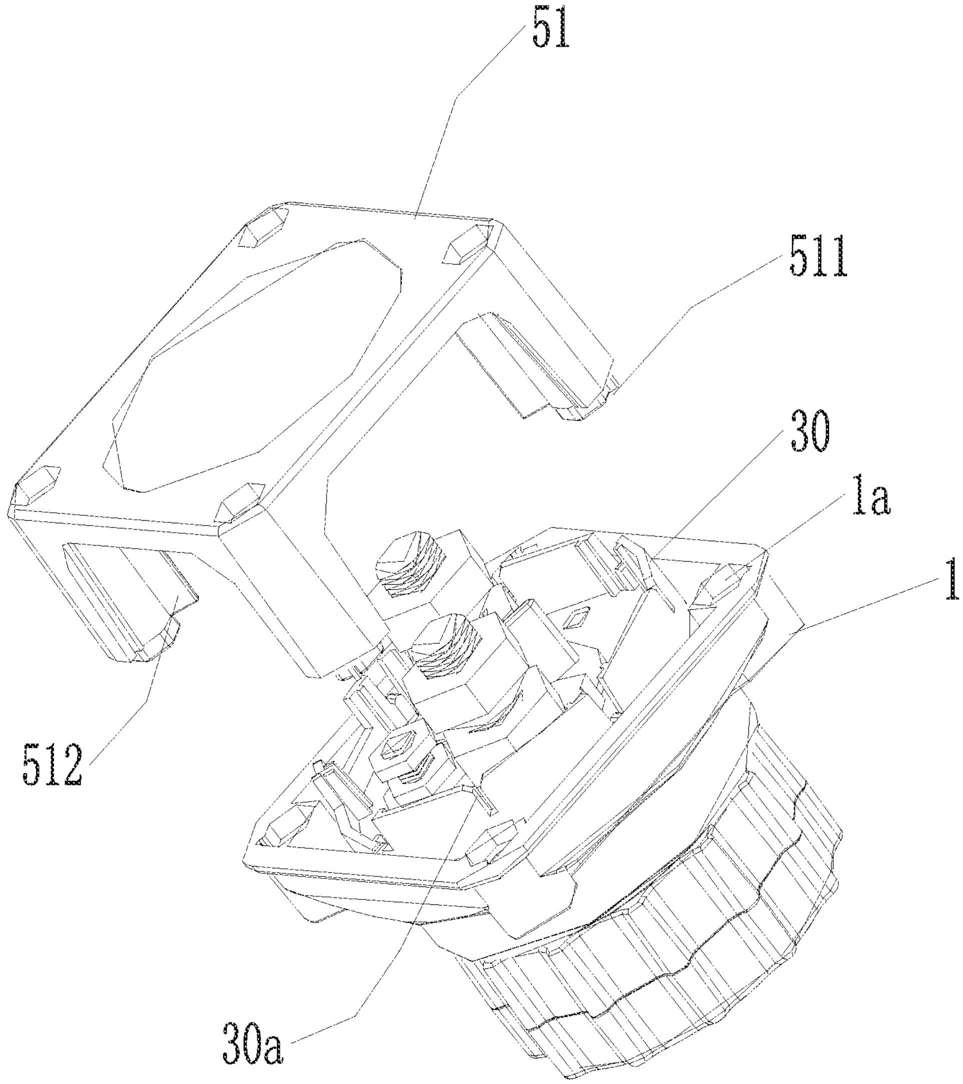
FIG. 15 is a partially exploded view of the digital display power switch with a detachable base according to the present disclosure.

In another embodiment, as shown in FIGS. 13 to 15, the digital display power switch further includes detachable base 5. The detachable base 5 is connected to a bottom of the housing 1. The detachable base 5 and the housing 1, or the fixed seat 30 form an interference fit or transition fit. The detachable base 5 includes base 51 and detachable sheet 52. A plurality of protruding ribs 511 are provided around the base 51. Connecting ribs 512 are adjacent to the protruding ribs 511. The protruding ribs 511 form an interference fit or transition fit with connecting holes 1*a* around the housing 1, and the connecting ribs form an interference fit or transition fit with recessed parts 30*a* of the fixed seat 30. The detachable sheet 52 is provided inside the base 51 in a piecewise manner. As shown in the figure, the detachable sheet 52 is divided into four pieces and detachably provided inside the base 51. The user can disassemble the detachable sheet in different direction according to a wiring direction, which is fast and convenient.

The preferred embodiments of the present disclosure are described above. But as mentioned above, it should be understood that the present disclosure is not limited to the form disclosed herein, and should not be regarded as an exclusion of other embodiments. The present disclosure also apply to various combinations, modifications and scenarios in other form, and changes can be made through the above guides and technologies or knowledge in the related fields within the scope of conception of the present disclosure described herein. Changes and variations made by those skilled in the art without departing from the spirit and scope of the present disclosure should fall within the protection scope of the appended claims of the present disclosure.

The invention claimed is:

1. A digital display power switch, comprising a rotating assembly, a conducting assembly, and a display assembly, wherein an accommodating space is formed in the rotating assembly; the display assembly is provided in the accommodating space, and the display assembly is not in contact with the rotating assembly; the rotating assembly is provided with an avoiding part, and a middle of the rotating assembly is provided with a rotating shaft; the conducting assembly comprises a fixed seat, a conductive sheet, a conducting element, and a connecting conductor; the conductive sheet is connected to the rotating shaft; the conducting element is located on the fixed seat; the conductive sheet is driven by the rotating shaft to form an electric connection contact point with the conducting element; the fixed seat is provided with a post; the post passes through the avoiding part and is then fixedly connected to the display assembly; and the connecting conductor electrically connects the conducting element to a circuit board of the display assembly.

2. The digital display power switch according to claim 1, further comprising a housing, wherein the rotating assembly is connected to the housing; the rotating shaft is inserted into the housing; and the post passes through the housing and the avoiding part and is then fixedly connected to the display assembly.

3. The digital display power switch according to claim 2, further comprising a detachable base, wherein the detachable base is connected to a bottom of the housing, and the detachable base comprises a base and a detachable sheet; the base and the housing form an interference fit or transition fit through a protruding rib and a connecting hole; and the detachable sheet is provided inside the base in a piecewise manner.

4. The digital display power switch according to claim 1, wherein a toggle sheet and a compression spring are provided in the accommodating space; the compression spring is provided between the conductive sheet and the toggle sheet; and the rotating shaft passes through the toggle sheet, the compression spring, and the conductive sheet in sequence and is then inserted into a central slot of the fixed seat.

5. The digital display power switch according to claim 1, wherein the conducting element comprises a first conducting element and a second conducting element; and the first conducting element and the second conducting element respectively contact two ends of the conductive sheet to form a path.

6. The digital display power switch according to claim 5, wherein the conducting element further comprises a third conducting element; and polarity of the third conducting element is opposite to polarity of the first conducting element or the second conducting element.

7. The digital display power switch according to claim 6, wherein the first conducting element or the second conducting element is a positive screw element, and the third conducting element is a negative screw element.

8. The digital display power switch according to claim 1, wherein the post comprises a first post and a second post; the display assembly is fixedly connected to the first post and the second post by the circuit board through a fixing rod; and a gap is formed between the display assembly and the rotating assembly.

9. The digital display power switch according to claim 8, wherein a guide rib is provided at a radial position of the first post or the second post; and the connecting conductor extends along the guide rib to the circuit board for soldering.

10. The digital display power switch according to claim 9, wherein the connecting conductor comprises a guide ring and a conducting post; the guide ring is fixedly sleeved on the conducting element; the conducting post extends along the post to the circuit board for connection; a periphery of the conducting post partially forms a clamping part; and the clamping part forms a limit fit with the guide rib of the post.

* * * * *